(12) United States Patent
Kawahara et al.

(10) Patent No.: US 10,133,294 B2
(45) Date of Patent: Nov. 20, 2018

(54) BEARING MEMBER FOR PEDAL ARM AND PEDAL ARM

(75) Inventors: Nobuyuki Kawahara, Toyota (JP); Masanobu Ichikawa, Toyota (JP)

(73) Assignee: Toyoda Iron Works Co., Ltd., Toyota-shi, Aichi (JP)

( * ) Notice: Subject to any disclaimer, the term of this patent is extended or adjusted under 35 U.S.C. 154(b) by 199 days.

(21) Appl. No.: 13/981,138

(22) PCT Filed: Oct. 7, 2011

(86) PCT No.: PCT/JP2011/073267
§ 371 (c)(1),
(2), (4) Date: Jul. 23, 2013

(87) PCT Pub. No.: WO2012/101872
PCT Pub. Date: Aug. 2, 2012

(65) Prior Publication Data
US 2013/0298723 A1  Nov. 14, 2013

(30) Foreign Application Priority Data
Jan. 24, 2011  (JP) ................. 2011-011607

(51) Int. Cl.
*G05G 1/445* (2008.04)
*B60T 7/06* (2006.01)
(Continued)

(52) U.S. Cl.
CPC ............ *G05G 1/445* (2013.01); *B60T 7/06* (2013.01); *B60T 11/18* (2013.01); *F16C 17/02* (2013.01);
(Continued)

(58) Field of Classification Search
CPC ......... Y10T 74/20528; Y10T 74/20534; Y10T 74/2054; Y10T 74/20888; Y10T 74/20708;
(Continued)

(56) References Cited

U.S. PATENT DOCUMENTS 2,026,757 A * 1/1936 Swanstrom ........... B23P 19/062
411/180
2,670,021 A * 2/1954 Torresen ............... F16B 37/067
29/509
(Continued)

FOREIGN PATENT DOCUMENTS

DE   102004042478 A1 * 3/2006 ............ F16B 37/065
DE   102011104971 A1 * 12/2012 ............ F16B 37/065
(Continued)

*Primary Examiner* — Daniel D Yabut
(74) *Attorney, Agent, or Firm* — Finnegan, Henderson, Farabow, Garrett & Dunner, LLP (57) ABSTRACT

A bearing member includes: a large-diameter tubular portion having an external diameter larger than a diameter of a mounting hole formed in a pedal arm and having a cylindrical inner peripheral face; a small-diameter tubular portion formed continuously with the large-diameter tubular portion, having a cylindrical outer peripheral face with a diameter smaller than that of the mounting hole, and having the cylindrical inner peripheral face; and a thin-wall tubular portion formed continuously with the small-diameter tubular portion, having an inner diameter larger than a diameter of the cylindrical inner peripheral face, and having the cylindrical outer peripheral face, and in a condition that the bearing member is inserted into the mounting hole such that the thin-wall tubular portion is protected, and the thin-wall tubular portion is swaged, the mounting hole is held between a swaged portion bulged radially outward and the large-diameter tubular portion.

11 Claims, 4 Drawing Sheets

(51) Int. Cl.
*F16C 17/02* (2006.01)
*F16C 35/02* (2006.01)
*G05G 1/46* (2008.04)
*B60T 11/18* (2006.01)

(52) U.S. Cl.
CPC ............... *F16C 35/02* (2013.01); *G05G 1/46* (2013.01); *Y10T 74/20888* (2015.01)

(58) Field of Classification Search
CPC ............ G05G 1/46; G05G 1/50; G05G 1/506; G05G 1/323; G05G 1/44; G05G 1/30; B60T 7/04; B60T 7/06; B60T 11/18; F16C 33/08; F16C 35/045; F16C 35/02
See application file for complete search history.

(56) References Cited

U.S. PATENT DOCUMENTS

| | | | |
|---|---|---|---|
| 3,744,340 A * | 7/1973 | Peterson | 74/560 |
| 4,494,883 A * | 1/1985 | Winter | 384/439 |
| 5,388,915 A * | 2/1995 | Huber | 384/439 |
| 7,374,382 B2 * | 5/2008 | Bentrim | 411/180 |
| 8,931,367 B2 * | 1/2015 | Himetani | 74/512 |
| 8,978,512 B2 * | 3/2015 | Himetani et al. | 74/512 |
| 2005/0095078 A1 * | 5/2005 | Makino | F16B 37/067 411/183 |
| 2005/0097722 A1 * | 5/2005 | Muller et al. | 29/525.06 |
| 2005/0278930 A1 * | 12/2005 | Szuba | B21J 15/32 29/464 |
| 2008/0148544 A1 * | 6/2008 | Shuart et al. | 29/509 |
| 2010/0058887 A1 * | 3/2010 | Fujita et al. | 74/512 |
| 2010/0307284 A1 * | 12/2010 | Himetani et al. | 74/560 |

FOREIGN PATENT DOCUMENTS

| | | | | |
|---|---|---|---|---|
| GB | 550445 A | * | 1/1943 | ............. F16B 39/38 |
| JP | 11-29014 | | 2/1999 | |
| JP | 2007-122610 | | 5/2007 | |

* cited by examiner

Prior Art

FIG.4(b)

Prior Art

US 10,133,294 B2

BEARING MEMBER FOR PEDAL ARM AND PEDAL ARM

CROSS-REFERENCE TO RELATED APPLICATIONS

This application is a national phase application of International Application No. PCT/JP2011/073267, filed Oct. 7, 2011, and claims the priority of Japanese Application No. 2011-011607, filed Jan. 24, 2011, the content of both of which is incorporated herein by reference.

TECHNICAL FIELD

The invention relates to a pedal arm, and more specifically to an improvement of a tubular bearing member which is disposed in a mounting hole formed in a plate member that constitutes the pedal arm, and through which a connecting shaft that has a cylindrical outer peripheral face is passed so as to be rotatable relative to the bearing member.

BACKGROUND ART

When a shaft such as a clevis pin is connected to a pedal arm so as to be rotatable relative to the pedal arm or when a pedal arm is supported pivotably, a bearing member is disposed in a plate member that constitutes the pedal arm. One example of such a pedal arm is described in Patent Document 1. The pedal arm has a hollow structure formed of a pair of halves, the pair of halves respectively has connecting holes, and a clevis pin is passed through the connecting holes so as to be rotatable relative to the halves. A cylindrical bearing member is fixedly provided in the connecting hole of one of the halves. Further, Patent Document 2 describes a technique in which a bearing member is swaged to be fixed to a mounting hole formed in a plate member that constitutes a pedal arm, and a connecting shaft such as a support shaft is connected to the plate member via the bearing member so as to be rotatable relative to the plate member. The hearing member has: (a) a large-diameter tubular portion having an external diameter larger than the diameter of the mounting hole and having a cylindrical inner peripheral face along which the connecting shaft is extended so as to be rotatable relative to the cylindrical inner peripheral face, and (b) a small-diameter tubular portion that is formed so as to be continuous and integral with the large-diameter tubular portion in an axial direction of the large-diameter tubular portion, that has a cylindrical outer peripheral face with a diameter smaller than that of the mounting hole, and that has the cylindrical inner peripheral face formed continuously from the large-diameter tubular portion, wherein (c) the small-diameter tubular portion inserted into the mounting hole from the small-diameter tubular portion side so as to project to the opposite side is swaged (compressed) in the axial direction, so that a peripheral portion of the mounting hole is held between a swaged portion that is bulged radially outward and the large-diameter tubular portion, whereby the bearing member is fixedly fitted to the mounting hole.

RELATED ART DOCUMENTS

Patent Documents

Patent Document 1: Japanese Patent Application Publication No. 2007-122610

Patent Document 2: Japanese Patent Application Publication No. 11-29014

SUMMARY OF THE INVENTION

Problem to be Solved by the Invention

However, in the case of the bearing member described in Patent Document 1, shear stress acts on a joint portion at which the bearing member is connected to the plate member, and it is therefore necessary to secure high joint strength. In this regard, in the case of the bearing member described in Patent Document 2, there is no possibility that shear stress will be generated because the bearing member is disposed so as to pass through the mounting hole. However, although the inner peripheral face of the swaged portion, that is, the cylindrical inner peripheral face of the small-diameter tubular portion functions as a bearing surface as it is, the inner peripheral face may be reduced in diameter or deformed due to swaging. Therefore, in some cases, it is difficult to secure accuracy required to obtain predetermined bearing performance.

Figure 4A:
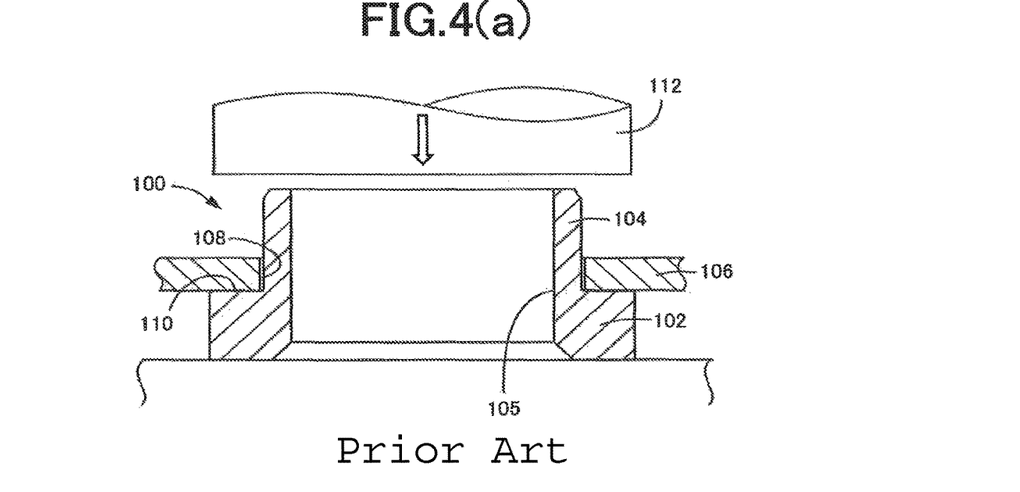
FIG. 4(a) and FIG. 4(b) are sectional views corresponding to FIG. 2(b) and FIG. 2(c), respectively.
Figure 4B:
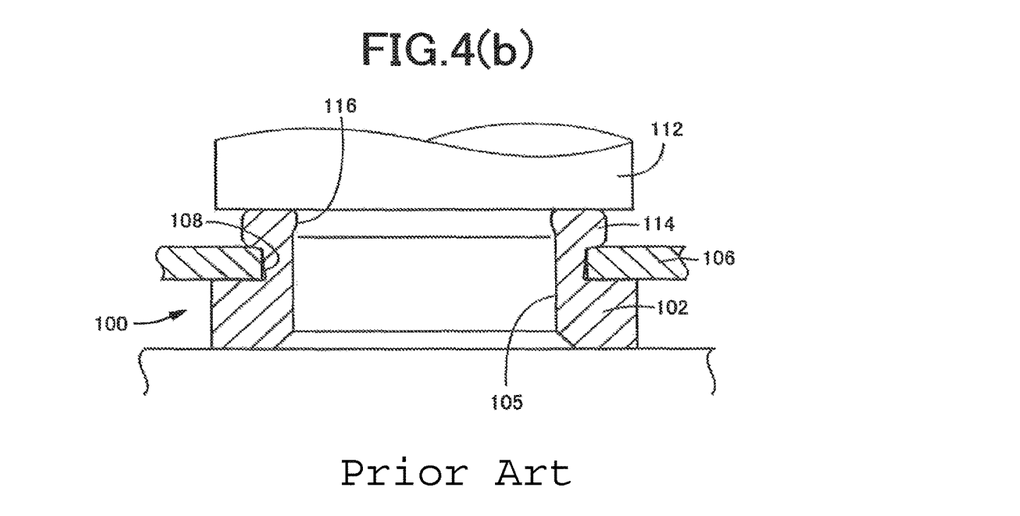

FIG. 4 is a view showing an example of a bearing member disposed by swaging as described above, wherein FIG. 4(a) shows a state before swaging is performed and FIG. 4(b) shows a state where the bearing member is fixedly fitted to a plate member by swaging. The bearing member 100 has a large-diameter tubular portion 102 and a small-diameter tubular portion 104 that are formed continuously and integrally with each other in an axial direction, and has a cylindrical inner peripheral face 105 that extends over the large-diameter tubular portions 102 and the small-diameter tubular portion 104 to function as a bearing surface. Then, swaging is performed by a punch 112 from the distal end side of the small-diameter tubular portion 104 in a state where the small-diameter tubular portion 104 is inserted into a mounting hole 108 formed in a plate member 106 that constitutes a pedal arm so that the plate member 106 is brought into contact with a step 110 formed between the large-diameter tubular portion 102 and the small-diameter tubular portion 104. Thus, the bearing member 100 is fixedly fitted to the mounting hole 108 such that a peripheral portion of the mounting hole 108 is held between a swaged portion 114 bulged radially outward and the large-diameter tubular portion 102. In that case, most part of the small-diameter tubular portion 104 bulges radially outward, but a part thereof bulges radially inward to form a deformed portion 116. This reduces the diameter of the cylindrical inner peripheral face 105 which is brought into contact with an outer peripheral face of a connecting shaft or reduces the roundness, thereby creating a possibility that predetermined bearing performance will not be obtained. The deformed portion 116 in FIG. 4(b) is formed when an inner peripheral side portion of the swaged portion 114 is bulged radially inward as a whole.

To cope with this, there may be employed a technique in which a holding jig such as a cored bar is placed in the small-diameter tubular portion 104 and swaging is performed with the inner peripheral face restrained by the holding jig. However, manufacturing cost will be increased because a large processing load (pressing load) is required and durability against abrasion needs to be secured.

The invention is made in light of the above-described circumstances, and it is an object of the invention to maintain appropriate accuracy of a cylindrical inner peripheral face of a bearing member, which functions as a bearing surface, without using a holding jig such as a cored bar, in a case where the bearing member is passed through a mounting hole and fitted to the mounting hole by swaging so that shear stress is not generated.

Means for Solving the Problem

The object indicated above is achieved in the first mode of the present invention, which provides a bearing member for a pedal arm, which is a tubular bearing member which is disposed in a circular mounting hole formed in a plate member that constitutes the pedal arm and through which a connecting shaft having a cylindrical outer peripheral face is passed so as to be rotatable relative to the bearing member, the bearing member characterized by including (a) a large-diameter tubular portion having an external diameter larger than a diameter of the mounting hole and having a cylindrical inner peripheral face along which the connecting shaft is extended so as to be rotatable relative to the cylindrical inner peripheral face; (b) a small-diameter tubular portion that is formed continuously and integrally with the large-diameter tubular portion in an axial direction of the large-diameter tubular portion, that has a cylindrical outer peripheral face with a diameter smaller than that of the mounting hole, and that has the cylindrical inner peripheral face formed continuously from the large-diameter tubular portion along an overall length of an axial length t of the small-diameter tubular portion; and (c) a thin-wall tubular portion that is formed continuously with the small-diameter tubular portion in the axial direction so as to be located on a side opposite to the large-diameter tubular portion and so as to be integral with the small-diameter tubular portion, that has an inner diameter larger than a diameter of the cylindrical inner peripheral face of the small-diameter tubular portion, and that has the cylindrical outer peripheral face formed continuously from the small-diameter tubular portion, (d) wherein by inserting the bearing member into the mounting hole from a thin-wall tubular portion side and swaging the thin-wall tubular portion, which projects from the mounting hole to an opposite side, in the axial direction, the bearing member is fixedly fitted to the mounting hole such that a peripheral portion of the mounting hole is held between a swaged portion bulged radially outward and the large-diameter tubular portion.

The second mode of the present invention provides the bearing member for a pedal arm according to the first mode of the invention, characterized in that the axial length t of the small-diameter tubular portion is equal to or smaller than a thickness d of the plate member.

The third mode of the present invention provides the bearing member for a pedal arm according to the first or second mode of the invention, characterized in that a clearance between the cylindrical outer peripheral face and the mounting hole is filled with the cylindrical outer peripheral face that is bulged and deformed by the swaging.

The fourth mode of the present invention provides a pedal arm having a hollow structure formed by integrally welding peripheral portions of a pair of plate-like halves having shapes obtained by dividing a shape of the pedal arm in a vehicle width direction, characterized in that: the pair of halves respectively has mounting holes; bearing members according to any one of the first to third modes of the invention are disposed in the respective mounting holes by swaging; and a single connecting shaft having a cylindrical outer peripheral face is passed through both the bearing members so as to be rotatable relative to the bearing members.

Effect of the Invention

As described above, the bearing member of the pedal arm includes the large-diameter tubular portion and the small-diameter tubular portion both having the cylindrical inner peripheral face that functions as a bearing surface are formed, and the thin-wall tubular portion having the cylindrical outer peripheral face formed continuously from the small-diameter tubular portion and an inner diameter larger than that of the cylindrical inner peripheral face of the small-diameter tubular portion. The thin-wall tubular portion is also formed integrally and continuously with the small-diameter tubular portion in the axial direction so as to be located on a side opposite to the large-diameter tubular portion. When the bearing member is inserted into the mounting hole from the thin-wall tubular portion side and the thin-wall tubular portion that project to the opposite side is savaged in the axial direction, the bearing member is fixedly fitted to the mounting hole such that the peripheral portion of the mounting hole is held between the swaged portion bulged radially outward and the large-diameter tubular portion. In that case, the thin-wall tubular portion having an inner diameter larger than that of the cylindrical inner peripheral face that functions as a bearing surface is swaged. Therefore, even if the cylindrical inner peripheral face of the thin-wall tubular portion bulges radially inward by swaging, the bearing performance will not be affected unless the cylindrical inner peripheral face becomes smaller in diameter than the cylindrical inner peripheral face of the large-diameter tubular portion and the small-diameter tubular portion 46. Therefore, accuracy of the cylindrical inner peripheral face that functions as a bearing surface is appropriately maintained without using any holding jig such as a cored bar, and the predetermined bearing performance is secured.

Further, the step is formed between the small-diameter tubular portion and the large-diameter tubular portion due to the difference in external diameter therebetween, and fitting is performed with the plate member placed on the step. Moreover, the entirety or part of the small-diameter tubular portion located inside the mounting hole, and the cylindrical inner peripheral face formed along the entirety of the axial length t of the small-diameter tubular portion is also located inside the mounting hole. Therefore, a load is efficiently transmitted between the plate member and the connecting shaft disposed so as to be in contact with the cylindrical inner peripheral face.

In the second mode of the invention, because the axial length t of the small-diameter tubular portion is equal to or smaller than the thickness d of the plate member, the cylindrical inner peripheral face of the small-diameter tubular portion is appropriately prevented from being bulged or deformed radially inward under the influence of swaging of the thin-wall tubular portion. Therefore, the accuracy of the first cylindrical inner peripheral face is appropriately maintained, and it possible to appropriately fit the bearing member to the mounting hole just by swaging the thin-wall tubular portion. Accordingly, a processing load required to be applied is reduced. Further when an axial length t of the small-diameter tubular portion is substantially equal to the thickness d of the plate member, In that case, an inappropriate positional relationship no longer occurs between the plate member and the connecting shaft disposed so as to be in contact with the cylindrical inner peripheral face of the small-diameter tubular portion, and a load is transmitted therebetween further efficiently.

In the third mode of the invention, because the clearance between the cylindrical outer peripheral face and the mounting hole is filled with the cylindrical outer peripheral face which is bulged and deformed by swaging, the bearing member is fixed to the mounting hole with high joint strength and a load is transmitted appropriately between the plate member and the connecting shaft disposed within the bearing member. There is no need that the clearance between the cylindrical outer peripheral face and the mounting hole is filled completely.

The pedal arm according to the fourth mode of the invention is configured such that the bearing members according to any one of the first to third modes of the invention are fitted respectively to the mounting holes formed in the pair of halves by swaging, and a single connecting shaft is disposed across the bearing members so as to be rotatable relative to the bearing members. This makes it possible to transmit a large load efficiently without causing, for example, an inappropriate positional relationship between the pedal arm and the connecting shaft.

BRIEF DESCRIPTION OF THE DRAWINGS

FIG. 1 illustrates views showing a brake pedal for a vehicle to which the invention is applied, wherein

FIG. 2 illustrates drawings of processes at the time when the bearing member is fitted to the mounting hole formed in the half by swaging in embodiment of FIG. 1, and FIG. 2(a) to FIG. 2(c) are sectional views corresponding to FIG. 1(c).

FIG. 3 illustrates drawings of another embodiment of the invention.

FIG. 4 illustrates drawings of the conventional bearing member.

MODES FOR CARRYING OUT THE INVENTION

The invention is suitably applied to, for example, a brake pedal, a clutch pedal, an accelerator pedal, and the like for vehicles, but may also be applied to operation pedals other than pedals for vehicles. Further, although the fourth invention relates to the pedal arm having a hollow structure formed of a pair of halves (plate members), the bearing members according to the first to third inventions may be applied also to an operation pedal having a pedal arm formed of, for example, a relatively-thick single plate member, or may be applied to a pedal arm having a hollow structure formed of a pair of halves, in which a single bearing member is provided at a portion at which the halves are overlapped so as to be in close contact with each other. The hollow structure is not necessarily configured such that a whole circumference is sealed in a saclike form, but may be opened partially.

The invention is suitably applied to a bearing member provided at a joint between a support shaft by which a pedal arm is pivotably supported and the pedal arm, a bearing member provided at a joint between a clevis pin that connects a pedal arm and a clevis such that the pedal arm and the clevis are rotatable relative to each other and the pedal arm, and the like.

The external diameter of a large-diameter tubular portion of a bearing member should be larger than that of a mounting hole, and it is preferable that an outer peripheral face of the large-diameter tubular portion have a cylindrical shape concentric with a cylindrical inner peripheral face. However, the outer peripheral face of the large-diameter tubular portion may be oval or polygon, or may have a cylindrical shape eccentric with respect to the cylindrical inner peripheral face. Although the cylindrical inner peripheral face of the large-diameter tubular portion may be formed along an overall length in an axial direction, it is preferable that a tapered guide hole which functions as a guide when a connecting shaft is inserted from a large-diameter tubular portion side be formed at an open end that is on the side opposite to a small-diameter tubular portion.

It is preferable that a cylindrical inner peripheral face and a cylindrical outer peripheral face of the small-diameter tubular portion of the bearing member be formed concentrically with each other, but they may be formed eccentrically. An inner diameter of a thin-wall tubular portion formed continuously with the small-diameter tubular portion should be larger than the diameter of the cylindrical inner peripheral face of the small-diameter tubular portion, and it is preferable that an inner peripheral face of the thin-wall tubular portion have a cylindrical shape concentric with a cylindrical outer peripheral face. However, the inner peripheral face of the thin-wall tubular portion may be oval or polygon, or may have a cylindrical shape eccentric with respect to the cylindrical outer peripheral face. The thin-wall tubular portion should be formed so as not to project radially inward beyond the cylindrical inner peripheral face of the small-diameter tubular portion and the large-diameter tubular portion, even if the thin-wall tubular portion is subjected to swaging and bulged or deformed radially inward. Although the boundary between the inner peripheral face of the thin-wall tubular portion and the cylindrical inner peripheral face of the small-diameter tubular portion may be a step, it is preferable that a tapered guide hole which functions as a guide when a connecting shaft is inserted from a swaged portion side, where the thin-wall tubular portion is subjected to swaging, be formed at the boundary with the small-diameter tubular portion.

When the bearing member is fitted to the mounting hole by swaging, at least the thin-wall tubular portion is compressed and deformed so as to bulge mainly radially outward. However, for example, in a case where an axial length t of the small-diameter tubular portion is larger than a thickness d of the plate member, part of the small-diameter tubular portion may be compressed and deformed together with the thin-wall tubular portion. When the thin-wall tubular portion receives a compressive load simply from the axial direction, compressive stress in a circumferential direction acts on an inner peripheral side, so that the thin-wall tubular portion is compressed and deformed so as to bulge mainly radially outward.

In the second invention, the axial length t of the small-diameter tubular portion is equal to or smaller than the thickness d of the plate member. However, in order that a load is transmitted to or from the connecting shaft efficiently, it is preferable that the axial length t be equal to or lager than a half of the thickness d. When the first invention is implemented, a small-diameter tubular portion having an axial length t larger than the thickness d of the plate member may be formed. In this case, swaging may be performed so that part of the small-diameter tubular portion is also compressed and deformed to be bulged radially outward and a peripheral portion of the mounting hole is held between the small-diameter tubular portion and the large-diameter tubular portion.

In the third invention, a clearance between the mounting hole and the cylindrical outer peripheral face shared by the small-diameter tubular portion and the thin-wall tubular portion is filled with the cylindrical outer peripheral face which is bulged and deformed by swaging. If the thin-wall tubular portion and the small-diameter tubular portion are swaged such that the peripheral portion of the mounting hole is held between the thin-wall tubular portion and the small-diameter tubular portion, and the large-diameter tubular portion, generally, portions of the cylindrical outer peripheral face near a swaged portion is also deformed to bulge radially outward. As a result, the clearance between the cylindrical outer peripheral face and the mounting hole is filled as in the third invent on so that the bearing member is fixedly fitted to the mounting hole.

Embodiments

Hereinafter, embodiments of the invention will be described in detail with reference to the accompanying drawings.

Figure 1A:
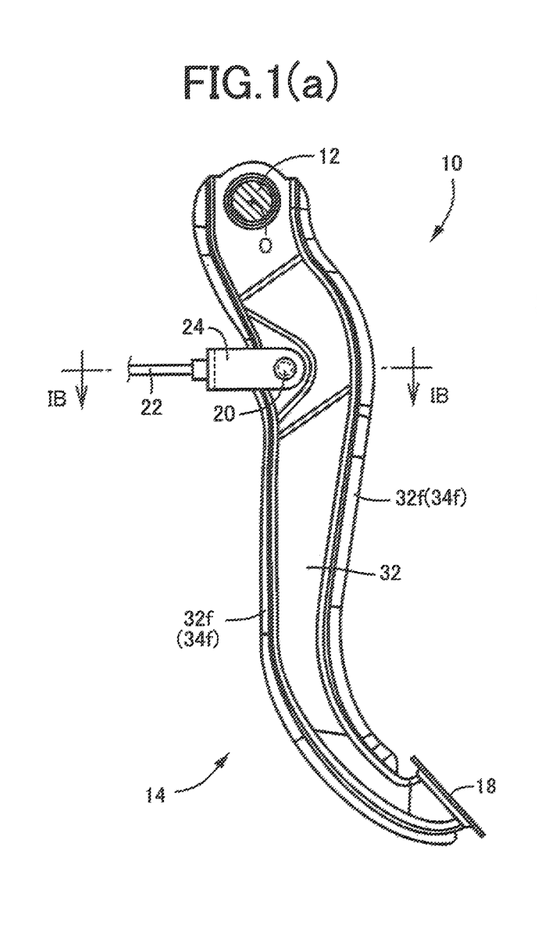
FIG. 1(a) is a left side view.
Figure 1B:
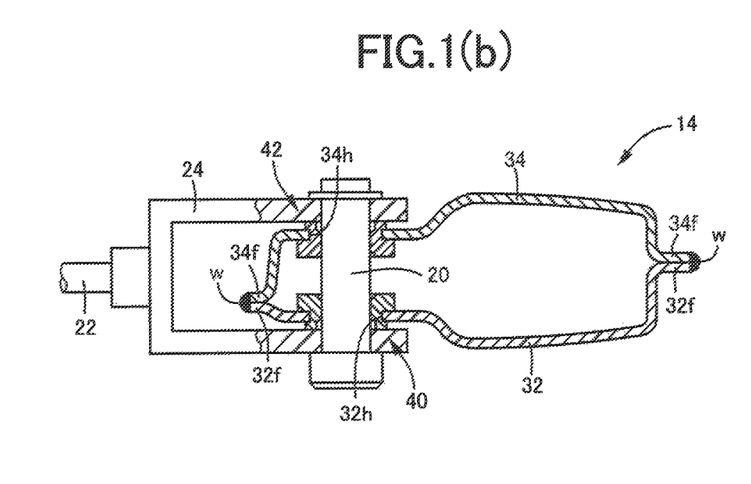
FIG. 1(b) is an enlarged view of a section taken along the line IB-IB in FIG. 1(a)
Figure 1C:
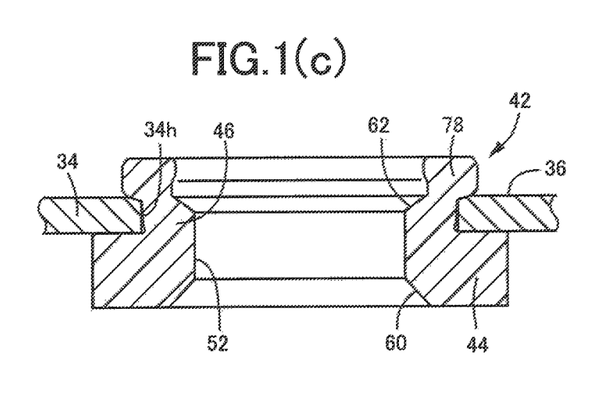
FIG. 1(c) is an enlarged sectional view showing one of bearing members.

FIG. 1 illustrates views showing a brake pedal 10 for a service brake of a vehicle to which the invention is applied, wherein FIG. 1(a) is a left side view, FIG. 1(b) is an enlarged view of a section taken along the line IB-IB in FIG. 1(a), and FIG. 1(c) is an enlarged sectional view showing one of bearing members. The brake pedal 10 has a pedal arm 14 as a main component. The brake pedal 10 is supported, at an upper end portion of the pedal arm 14, so as to be pivotable about a support axis O, which is an axis of a substantially horizontal support shaft 12. A lower end portion of the pedal arm 14 is bent diagonally upward in a direction toward the rear of the vehicle so as to be oriented toward a driver seat, and a pedal sheet 18 is fixedly fitted to the distal end portion of the pedal arm 14. When a driver depresses the pedal sheet 18, the brake pedal 10 pivots clockwise about the support shaft 12 in FIG. 1(a). An output member 22 such as a pushrod is connected to the brake pedal 10 via a clevis 24 so as to be pivotable, relative to the brake pedal 10, about an axis of a clevis pin 20, which is substantially parallel to the support shaft 12. When the output member 22 is mechanically pushed leftward in FIG. 1(a) as the brake pedal 10 pivots, brake hydraulic pressure is generated on the basis of the depression force applied to the brake pedal 10. In the present embodiment, the clevis pin 20 corresponds to a connecting shaft.

The pedal arm 14 has a hollow structure having a substantially quadrangular section, and is formed of a pair of halves 32, 34 having shapes obtained by equally dividing the shape of the pedal arm in the lateral direction in the vehicle width direction. The halves 32, 34 are formed by subjecting a steel sheet to press forming, and each of them has a substantially hat-shape in section. In a state where the halves 32, 34 are in such positions that the opening sides of their hat-shapes face each other and plate-like outer peripheral flanges 32f, 34f, which are formed at peripheral portions so as to extend outward and which are parallel to each other, are overlapped so as to be in close contact with each other, outer edges of the outer peripheral flanges 32f, 34f, that is, edges thereof in the vehicle longitudinal direction and on the lower side in the vehicle are joined integrally with each other by arc welding or the like. A reference sign W in FIG. 1(b) indicates welded portions of the outer peripheral flanges 32f, 34f.

In pivot connecting portions of the pair of halves 32, 34, at which the clevis pin 20 is disposed, there are concentrically formed circular mounting holes 32h, 34h each having a diameter larger than that of a shaft portion of the clevis pin 20, and metal bearing members 40, 42 are fixedly fitted to the mounting holes 32h, 34h by swaging (squeezing). The shaft portion of the clevis pin 20, which has a cylindrical outer peripheral face, is disposed across the bearing members 40, 42 such that the clevis pin 20 is passed through the bearing members 40, 42 so as to be rotatable relative to the bearing members 40, 42, and the clevis pin 20 is prevented from being slipped out of the bearing members 40, 42 by a snap ring or the like. The bearing members 40, 42 have the same shape, and are disposed in the mountings hole 32h, 34h in such positions that the bearings 40, 42 are symmetrically oriented, that is, the bearings 40, 42 are oppositely oriented. The pair of halves 32, 34 corresponds to a plate member that constitutes the pedal arm 14.

Figure 2A:
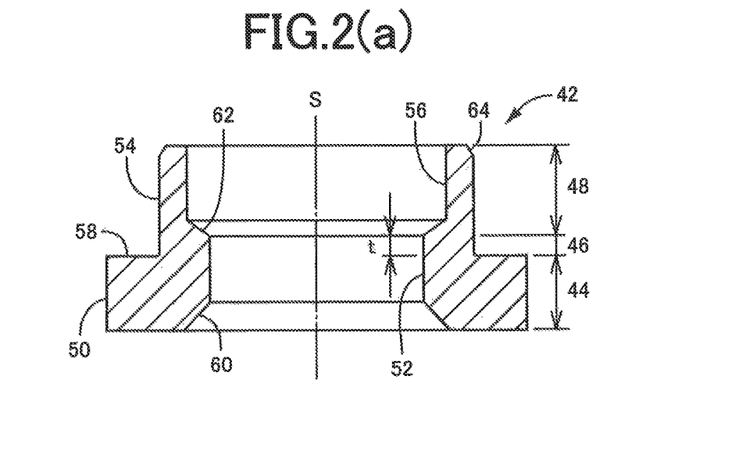

FIG. 1(c) is an enlarged view for concretely describing the bearing member 42 fitted to the mounting hole 34h of the half 34, which is one of the pair of halves 32, 34, and FIG. 2 illustrates drawings of processes at the time when the bearing member 42 is fitted to the mounting hole 34h by swaging. In a state before the bearing member 42 is fitted to the mounting hole 34h as illustrated in FIG. 2(a), the bearing member 42 has a cylindrical shape in which a large-diameter tubular portion 44, a small-diameter tubular portion 46, and a thin-wall tubular portion 48 are formed in this order concentrically with respect to a common axis S and integrally with each other in an axial direction. The large-diameter tubular portion 44 has a first cylindrical outer peripheral face 50 having a diameter larger than that of the mounting hole 34h, and has a first cylindrical inner peripheral face 52 along which the shaft portion of the clevis pin 20 is extended so as to be rotatable relative to the first cylindrical inner peripheral face 52. The first cylindrical outer peripheral face 50 and the first cylindrical inner peripheral face 52 are formed concentrically with respect to the axis S. The first cylindrical inner peripheral face 52 corresponds to a cylindrical inner peripheral face as claimed, which is a portion that functions as a bearing surface, and is formed to have diameter slightly larger than that of the shaft portion of the clevis pin 20.

The small-diameter tubular portion 46 is formed continuously with the large-diameter tubular portion 44 in an axial direction of the large-diameter tubular portion 44 so as to be concentric and integral with the large diameter tubular portion 44. In addition, the smaller-diameter tubular portion 46 has a second cylindrical outer peripheral face 54 with a diameter smaller than that of the mounting hole 34h, and the first cylindrical inner peripheral face 52 is formed along an overall length of an axial length t of the small-diameter tubular portion 44. The second cylindrical outer peripheral face 54 is also formed concentrically with respect to the axis S. Due to a difference in external diameter between the small-diameter tubular portion 46 and the large-diameter tubular portion 44, and an annular step 58 is formed at a right angle to the axis S at the boundary therebetween. The second cylindrical outer peripheral face 54 corresponds to a cylindrical outer peripheral face as claimed, and has a diameter that is set to such a value that a small clearance is formed between the second cylindrical outer peripheral face 54 and the mounting hole 34h.

The thin-wall tubular portion 48 is formed continuously with the small-diameter tubular portion 46 in an axial direction of the small-diameter tubular portion 46 so as to be located on the side opposite to the large-diameter tubular portion 44 and to be concentric with the small-diameter tubular portion 46. In addition, the thin-wall tubular portion 48 has a second cylindrical inner peripheral face 56 with a diameter larger than that of the first cylindrical inner peripheral face 52, and the second cylindrical outer peripheral face 54 is formed continuously from the small-diameter tubular portion 46. The second cylindrical inner peripheral face 56 is also formed concentrically with respect to the axis S.

Figure 2B:
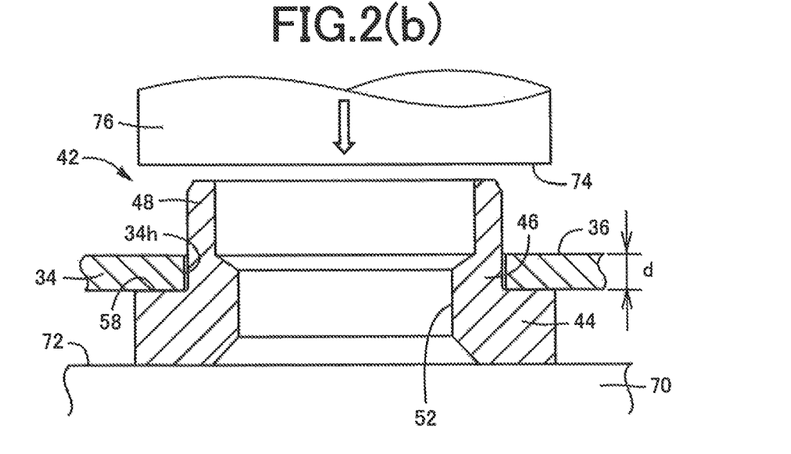

Further, at a portion at which the first cylindrical inner peripheral face 52 opens at an end face on the large-diameter tubular portion 44 side, there is formed a tapered guide face 60 of which the diameter increases toward the opening side. When the clevis pin 20 is inserted into the bearing member 42 from the large-diameter tubular portion 44 side, the guide face 60 smoothly guides the clevis pin 20 to the first cylindrical inner peripheral face 52. At the boundary between the second cylindrical inner peripheral face 56 of the thin-wall tubular portion 48 and the first cylindrical inner peripheral face 52, there is formed a tapered guide face 62 of which the diameter decreases toward the first cylindrical inner peripheral face 52. When the clevis pin 20 is inserted into the bearing member 42 from the side opposite to the large-diameter tubular portion 44, the guide face 62 smoothly guides the clevis pin 20 to the first cylindrical inner peripheral face 52. Further, the thin-wall tubular portion 48 has a chamfer 64 at an outer peripheral face of its distal end portion which is on the side opposite to the small-diameter tubular portion 46. As illustrated in FIG. 2(b), when the bearing member 42 is inserted into the mounting hole 34h of the half 34 from the thin-wall tubular portion 48 side, the bearing member 42 is easily inserted into the mounting hole 34h.

Figure 2C:
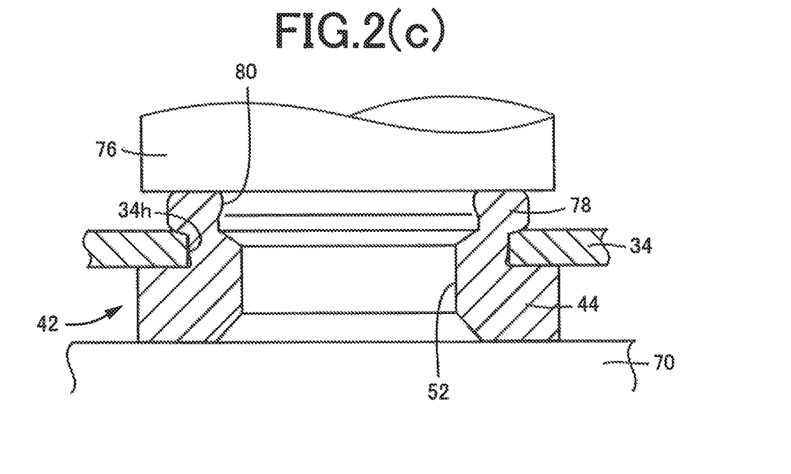

When the thus-configured bearing member 42 is swaged to be fixed to the mounting hole 34h of the half 34, initially, as illustrated in FIG. 2(b), the bearing member 42 is placed on a substantially horizontal and flat mounting face 72 of a base 70, in such a position that the large-diameter tubular portion 44 side is oriented downward, and the half 34 is moved closer to the baring member 42 from above so that the thin-wall tubular portion 48 is relatively inserted into the mounting hole 34h, and is placed on the step 58. In this state, a swaging punch 76 having a substantially horizontal and flat forming face 74 is moved downward to perform swaging so that the thin-wall tubular portion 48 that projects upward from the mounting hole 34h is compressed and deformed in the axial direction. When an axial compressive load is applied to the thin-wall tubular portion 48 as described above, compressive stress in a circumferential direction acts on the inner peripheral side, so that the thin-wall tubular portion 48 is compressed and deformed so as to bulge mainly radially outward. As a result, a swaged portion 78 that largely bulges radially outward as illustrated in FIG. 2(c) is formed, and the bearing member 42 is fixedly fitted to the mounting hole 34h so that the peripheral portion of the mounting hole 34h is held between the swaged portion 78 and the large-diameter tubular portion 44.

The axial length t of the small-diameter tubular portion 46 of the bearing member 42 is within a range from d/2 to d, which is a thickness d of the half 34, and in the present embodiment, the axial length t is slightly larger than d/2. A large-diameter end point of the tapered guide face 62 (lower point of the second cylindrical inner peripheral face 56) substantially coincides with a top face (face that is oriented outward in a state of the pedal arm 14) 36 of the half 34. Therefore, mainly a portion of the thin-wall tubular portion 48, which is located above the guide face 62, is compressed and deformed. Accordingly, there is almost no possibility that the first cylindrical inner peripheral face 52, which is formed at the large-diameter tubular portion 44 and the small-diameter tubular portion 46, will be deformed by swaging. Furthermore, a portion of the second cylindrical outer peripheral face 54, which is located inside the mounting hole 34h, is bulged radially outward, thereby filling the clearance so that the second cylindrical outer peripheral face 54 partially contacts the inner peripheral face of the mounting hole 34h. As a result, the bearing member 42 is fixed to the half 34 with high joint strength. Further, although a portion of the thin-wall tubular portion 48 is bulged radially inward so as to form a deformed portion 80 at an inner peripheral side of the swaged portion 78, a projecting length thereof is small and there is no possibility that the deformed portion 80 will project radially inward beyond the first cylindrical inner peripheral face 52 that functions as a bearing surface to reduce the bearing performance. Therefore, the diameter of the second cylindrical inner peripheral face 56 of the thin-wall tubular portion 48 is set by taking into account the projecting length of the deformed portion 80 so that the deformed portion 80 does not project radially inward beyond the first cylindrical inner peripheral face 52.

Note that the half 34 at the time when the bearing member 42 is fixed thereto by swaging as described above may have been pressed into a predetermined hat-shape as illustrated in FIG. 1(b), but may be in a substantially flat blank state where the half 34 has not been pressed.

As described above, in the bearing member 42 of the brake pedal 10 according to the present embodiment, the large-diameter tubular portion 44 and the small-diameter tubular portion 46 both having the first cylindrical inner peripheral face 52 that functions as a bearing surface are formed, and the thin-wall tubular portion 48 having the second cylindrical outer peripheral face 54 formed continuously from the small-diameter tubular portion 46 and the second cylindrical inner peripheral face 56 with a diameter larger than that of the first cylindrical inner peripheral face 52 is also formed integrally and continuously with the small-diameter tubular portion 46 in the axial direction. When the bearing member 42 is inserted into the mounting hole 34h from the thin-wall tubular portion 48 side and the thin-wall tubular portion 48 that project to the opposite side (upward) is swaged in the axial direction, the bearing member 42 is fixedly fitted to the mounting hole 34h such that the peripheral portion of the mounting hole 34h is held between the swaged portion 78 bulged radially outward and the large-diameter tubular portion 44.

In that case, mainly the thin-wall tubular portion 48 having an inner diameter larger than that of the first cylindrical inner peripheral face 52 that functions as a bearing surface is swaged. Therefore, even if the second cylindrical inner peripheral face 56 of the thin-wall tubular portion 48 bulges radially inward by swaging, the bearing performance will not be affected unless the second cylindrical inner peripheral face 56 becomes smaller in diameter than the first cylindrical inner peripheral face 52 of the large-diameter tubular portion 44 and the small-diameter tubular portion 46. Therefore, accuracy of the first cylindrical inner peripheral face 52 that functions as a bearing surface is appropriately maintained without using any holding jig such as a cored bar, and the predetermined bearing performance is secured.

Further, the step 58 is formed between the small-diameter tubular portion 46 and the large-diameter tubular portion 44 due to the difference in external diameter therebetween, and swaging is performed with the half 34 placed on the step 58. Moreover, because the axial length t of the small-diameter tubular portion 46 is within the range from d/2 to d, the entirety of the small-diameter tubular portion 46 overlaps with the thickness d of the half 34 and located inside the mounting hole 34h, and the first cylindrical inner peripheral face 52 formed along the entirety of the axial length t of the small-diameter tubular portion 46 is also located inside the mounting hole 34h. Therefore, a load is efficiently transmitted between the half 34 and the clevis pin 20 disposed so as to be in contact with the first cylindrical inner peripheral face 52.

Further, because the axial length t of the small-diameter tubular portion 46 is within the range from d/2 to d, which is the thickness d of the half 34, the first cylindrical inner peripheral face 52 of the small-diameter tubular portion 46 is appropriately prevented from being bulged or deformed radially inward under the influence of swaging of the thin-wall tubular portion 48. Therefore, the accuracy of the first cylindrical inner peripheral face 52 is appropriately maintained, and it possible to appropriately fit the bearing member 42 to the mounting hole 34h just by swaging the thin-wall tubular portion 48. Accordingly, a processing load required to be applied by the punch 76 is reduced.

Further, because the clearance between the second cylindrical outer peripheral face 54 and the mounting hole 34h is filled with the second cylindrical outer peripheral face 54 which is bulged and deformed by swaging, the bearing member 42 is fixed to the mounting hole 34h with high joint strength and a load is transmitted appropriately between the half 34 and the clevis pin 20 disposed within the bearing member 42.

Note that the other bearing member 40 is also fixed to the mounting hole 32h of the half 32 by swaging as in the case of the bearing member 42, and the same advantageous effects as those obtained by the bearing member 42 are obtained. In addition, the pedal arm 14 according to the present embodiment is configured such that the bearing members 40, 42 are fitted respectively to the mounting holes 32h, 34h formed in the pair of halves 32, 34 by swaging, and a single clevis pin 20 is disposed across the bearing members 40, 42 so as to be rotatable relative to the bearing members 40, 42. This makes it possible to transmit a large load efficiently without causing, for example, an inappropriate positional relationship between the pedal arm 14 and the clevis pin 20.

Figure 3A:
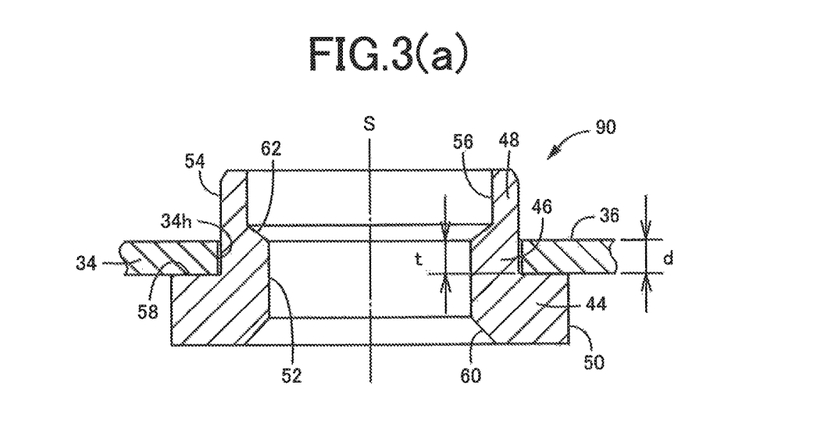
FIG. 3(a) and FIG. 3(b) are sectional views corresponding to FIG. 2(b) and FIG. 2(c), respectively, and a processing tool such as the punch is omitted in these drawings.
Figure 3B:
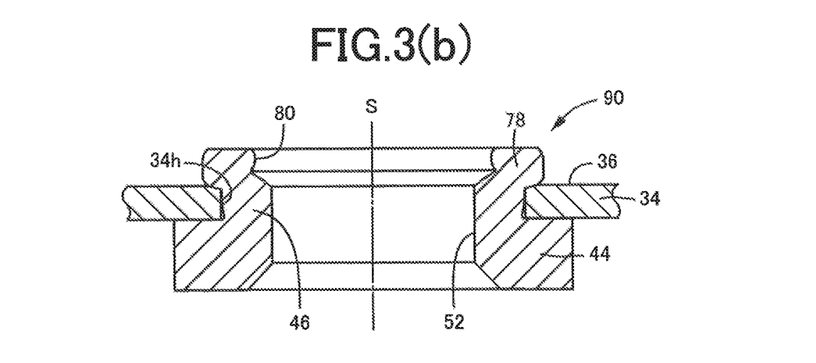

In the meantime, in the present embodiment, the axial length t of the small-diameter tubular portion 46 is within the range from d/2 to d, which is the thickness d of the half 34 and is slightly larger than d/2, and the large-diameter end point of the tapered guide face 62 substantially coincides with the top face 36 of the half 34. However, there may be employed a bearing member 90 in which an axial length t of the small-diameter tubular portion 46 is substantially equal to the thickness d of the half 34, as illustrated in FIG. 3. In this case, because the first cylindrical inner peripheral face 52 of the small-diameter tubular portion 46 is present along the overall axial length of the mounting hole 34h, an inappropriate positional relationship no longer occurs between the half 34 and the clevis pin 20 disposed so as to be in contact with the first cylindrical inner peripheral face 52, and a load is transmitted therebetween further efficiently. Further, in a case where the axial length t is larger than the thickness d, there are possibilities that the length of the thin-wall tubular portion 48 will be reduced and the swaged portion 78 used to obtain the predetermined joint strength will not be formed or that even if the swaged portion 78 used to obtain the predetermined joint strength is formed, a processing load will be increased. However, such possibilities do not arise according to the present embodiment. FIG. 3(a) and FIG. 3(b) are sectional views corresponding to FIG. 2(b) and FIG. 2(c), respectively, and a processing tool such as the punch 76 is omitted in these drawings.

The embodiments of the invention are described in detail with reference to the drawings. However, the above-described embodiments are just examples of the embodiments. The invention may be implemented in various other embodiments obtained by making modifications or improvements to the above-described embodiments on the basis of the knowledge of persons skilled in the art.

REFERENCE SIGNS LIST

14: pedal arm 20: clevis pin (connecting shaft) 32, 34: half (plate member) 32h, 34h: mounting hole 40, 42, 90: bearing member 44: large-diameter tubular portion 46: small-diameter tubular portion 48: thin-wall tubular portion 52: first cylindrical inner peripheral face (cylindrical inner peripheral face) 54: second cylindrical outer peripheral face (cylindrical outer peripheral face) 78: swaged portion t: axial length of the small-diameter tubular portion
d: thickness

The invention claimed is:

1. A method for manufacturing a pedal arm including (i) a plate member having a mounting hole, (ii) a bearing member that is a tubular bearing member disposed in the mounting hole of the plate member, and (iii) a connecting shaft having a cylindrical outer peripheral face and passed through the bearing member so as to be rotatable relative to the bearing member, wherein the bearing member includes (ii-1) a large-diameter tubular portion having a first outer peripheral face with an external diameter larger than a diameter of the mounting hole and having a first inner peripheral face along which the connecting shaft is extended so as to be rotatable relative to the first inner peripheral face, (ii-2) a small-diameter tubular portion that is contiguous with the large-diameter tubular portion in an axial direction of the large-diameter tubular portion, the small-diameter tubular portion having a second outer peripheral face that is fitted in the mounting hole, the small-diameter tubular portion having the first inner peripheral face formed continuously from the large-diameter tubular portion, (ii-3) a swaged tubular portion that is contiguous with the small-diameter tubular portion in the axial direction and located on a side opposite to the large-diameter tubular portion, (ii-4) the swaged tubular portion being a deformed portion including a radially outwardly bulged portion and a radially inwardly bulged portion, (ii-5) the radially outwardly bulged portion being bulged radially outwardly and cooperating with the large-diameter tubular portion to grip the plate-member that is provided with the mounting hole in which the second outer peripheral face of the small-diameter tubular portion is fitted, and (ii-6) the radially inwardly bulged portion being bulged radially inwardly without any part of the radially inwardly bulged portion being located radially inside the first inner peripheral face of the large-diameter tubular portion and the small-diameter tubular portion, which serves as a bearing surface of the bearing member, the method being for manufacturing the pedal arm, by using a tubular member that is to be converted into the bearing member in a process of manufacturing the pedal arm, the method comprising:
preparing the tubular member including (i) the large-diameter tubular portion, (ii) the small-diameter tubular portion, and (iii) a thin-wall tubular portion that is formed continuously with the small-diameter tubular portion in the axial direction so as to be located on a side opposite to the large-diameter tubular portion and so as to be integral with the small-diameter tubular portion, the thin-wall tubular portion having a second inner peripheral face with an inner diameter larger than an inner diameter of the first inner peripheral face of the small-diameter tubular portion, the thin-wall tubular portion having the second outer peripheral face formed continuously from the small-diameter tubular portion, a thickness of the thin-wall tubular portion being dependent on the external diameter of the second outer peripheral face and the inner diameter of the second inner peripheral face, and being smaller than a thickness of the small-diameter tubular portion that is dependent on the external diameter of the second outer peripheral face and the inner diameter of the first inner peripheral face, attaching the tubular member to the plate member, by introducing the small-diameter tubular portion of the tubular member through the mounting hole of the plate member, and by bringing a surface of the plate member into contact with a step which is formed between the large-diameter tubular portion and the small-diameter tubular portion and which corresponds to one of axially end faces of the large-diameter tubular portion;

setting the tubular member and the plate member on a base such that the other of the axially end faces of the large-diameter tubular portion is in contact with the base; and applying, to the tubular member, a compressive load that is a load acting in a direction toward the base, such that the thin-wall tubular portion is compressed axially and bulged radially inwardly and outwardly whereby the thin-wall tubular portion is deformed to the swaged tubular portion including the radially outwardly bulged portion and the radially inwardly bulged portion, and such that the radially outwardly bulged portion is bulged radially outwardly and cooperates with the large-diameter tubular portion to grip the plate member that is provided with the mounting hole in which the small-diameter tubular portion is introduced, while the radially inwardly bulged portion is bulged radially inwardly without any part of the radially inwardly bulged portion being located radially inside the first inner peripheral face of the large-diameter tubular portion and the small-diameter tubular portion, which serves as the bearing surface of the bearing member, wherein the compressive load is applied to the bearing member in the direction toward the base, without using a bar, which is to be placed in an axial hole of the bearing member.

2. The method according to claim 1, further comprising: determining the axial length of the small-diameter tubular portion of the bearing member such that the axial length of the small-diameter tubular portion is equal to or smaller than a thickness of the plate member.

3. The method according to claim 2, wherein the compressive load is applied to the bearing member in the direction toward the base such that a clearance between the second outer peripheral face of the small diameter tubular portion and the mounting hole is filled with the second outer peripheral face of the small-diameter tubular portion that is deformed to be bulged radially outwardly by application of the compressive load to the bearing member.

4. The method according to claim 1, wherein the compressive load is applied to the bearing member in the direction toward the base such that a clearance between the second outer peripheral face of the small-diameter tubular portion and the mounting hole is filled with the second outer peripheral face of the small-diameter tubular portion that is deformed to be bulged radially outwardly by application of the compressive load to the bearing member.

5. The method according to claim 1, wherein the thin-wall tubular portion of the tubular member, which is to be converted into the bearing member in the process of manufacturing the pedal arm, has a chamfered portion that is chamfered on the second outer peripheral face in a distal end portion of the thin-wall tubular portion, which is on a side opposite to the small-diameter tubular portion.

6. The method according to claim 1, wherein the external diameter of the second outer peripheral face of the tubular member, which is to be converted into the bearing member in the process of manufacturing the pedal arm, is substantially constant in the axial direction at least in the small-diameter tubular portion, without any part of the thin-wall tubular portion being located radially outside the small-diameter tubular portion.

7. The method according to claim 1, wherein the inner diameter of the second inner peripheral face of the thin-wall tubular portion of the tubular member, which is to be converted into the bearing member in the process of manufacturing the pedal arm, is substantially constant in the axial direction.

8. The method according to claim 1, wherein the first inner peripheral face of the large-diameter tubular portion and the small-diameter tubular portion and the second inner peripheral face of the thin-wall tubular portion of the tubular member, which is to be converted into the bearing member in the process of manufacturing the pedal arm, are connected to each other via a tapered inner face that is located between the first inner peripheral face and the second inner peripheral face in the axial direction.

9. The method according to claim 1, wherein the compressive load is applied to the bearing member in the direction toward the base, by bringing a punch in contact at a flat face thereof with an axial end face of the thin-wall tubular portion of the bearing member and applying, to the punch, a force that acts in the direction toward the base.

10. The method according to claim 1, comprising:
determining the thickness and an axial length of the thin-wall tubular portion of the bearing member such that the radially inwardly bulged portion of the swaged tubular portion is bulged radially inwardly without any part of the radially inwardly bulged portion being located radially inside the first inner peripheral face that serves as the bearing surface.

11. The method according to claim 1,
wherein the pedal arm includes a hollow structure provided by a pair of plate-like halves having shapes obtained by dividing a shape of the pedal arm in a vehicle width direction, each of the plate-like halves being provided by the plate member,
the method comprising:
attaching a pair to bearing members, each of which is provided by the bearing member, to the respective plate-like halves; and
forming the hollowing structure by fixing peripheral portions of the respective plate-like halves to each other.

* * * * *